United States Patent [19]

Oiwa

[11] Patent Number: 4,877,943
[45] Date of Patent: Oct. 31, 1989

[54] SEALING DEVICE FOR ELONGATE HEATER

[75] Inventor: Thomas Y. Oiwa, San Mateo, Calif.

[73] Assignee: Raychem Corporation, Menlo Park, Calif.

[21] Appl. No.: 282,250

[22] Filed: Dec. 8, 1988

[51] Int. Cl.$^4$ ............................................. H02G 15/02
[52] U.S. Cl. .................................... 219/538; 174/74 A
[58] Field of Search ............... 219/538; 174/87, 74 A; 439/449, 430

[56] References Cited

U.S. PATENT DOCUMENTS 4,721,832 1/1988 Toy ..................... 174/74 A
4,751,350 1/1988 Eaton ................... 174/74 A

*Primary Examiner*—A. D. Pellinen
*Assistant Examiner*—Leon K. Fuller
*Attorney, Agent, or Firm*—Marguerite E. Gerstner; Timothy H. P. Richardson; Herbert G. Burkard

[57] ABSTRACT

An apparatus which is suitable for sealing the end of an elongate electrical heater comprising both an insulating polymeric jacket and a metallic grounding braid surrounding the insulating jacket. Gripping members within the apparatus serve to grip both the insulating jacket and the braid, thus preventing slippage of one past the other. The apparatus is designed so that under some conditions the braid is readily pushed back from the end of the heater upon insertion.

18 Claims, 2 Drawing Sheets

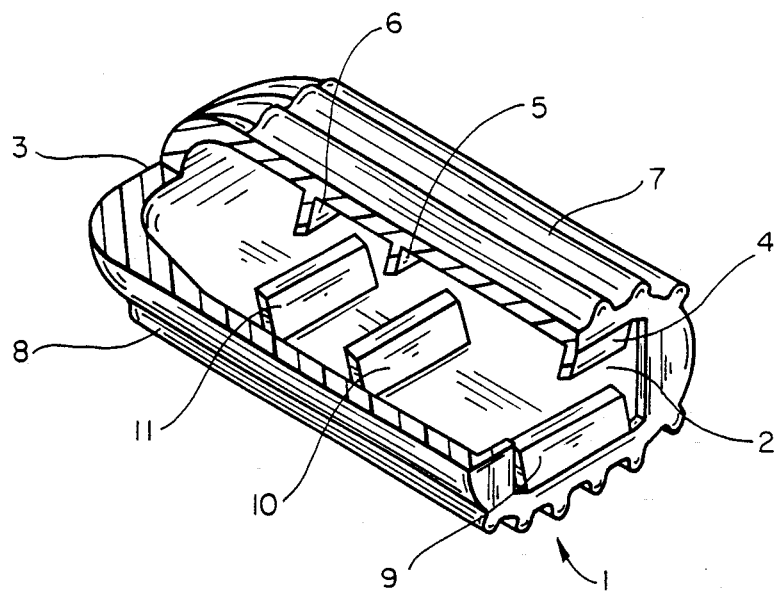
FIG_1
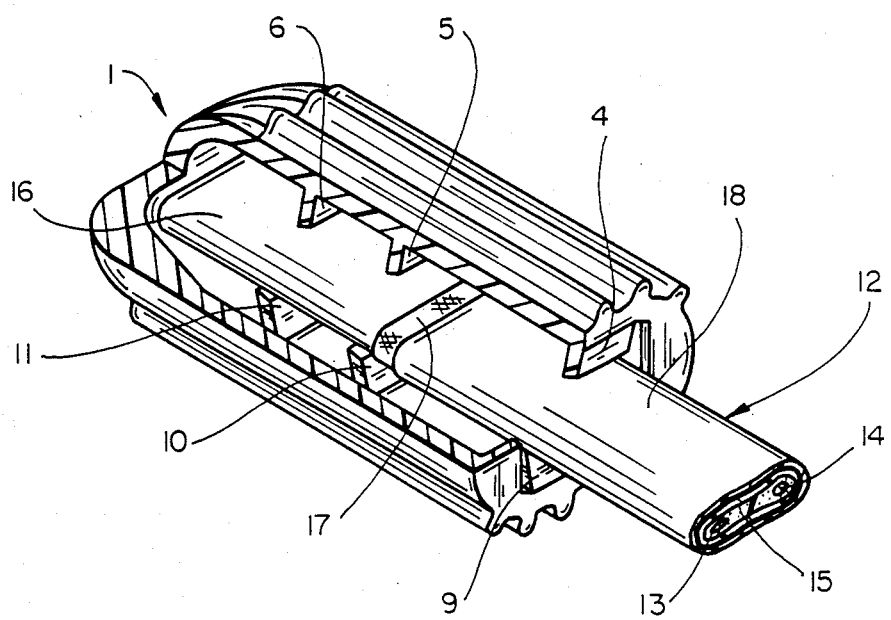
FIG_2

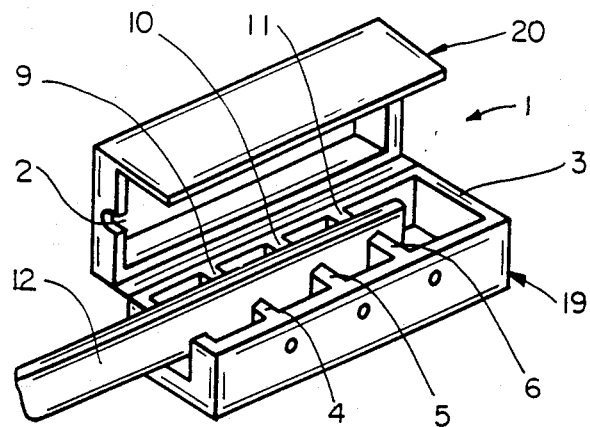
FIG_3
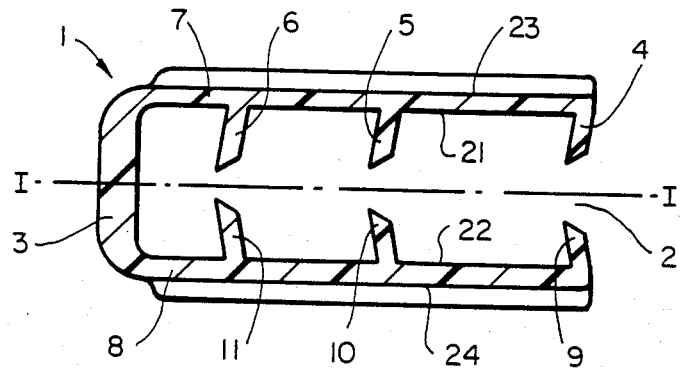
FIG_4
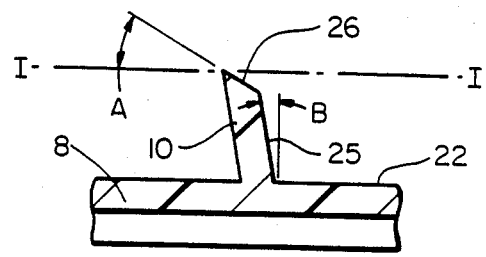
FIG_5

SEALING DEVICE FOR ELONGATE HEATER

CROSS REFERENCE TO RELATED APPLICATIONS

This application is related to U.S. application Ser. No. 281,580 (Bautista), filed contemporaneously with this application, the disclosure of which is incorporated herein by reference.

BACKGROUND OF THE INVENTION

1. Field of the Invention

This invention relates to sealing devices, particularly sealing devices for elongate electrical heaters.

2. Introduction to the Invention

Elongate electrical heaters are well known for use, for example, in the freeze protection and temperature maintenance of pipes. Particularly useful elongate heaters comprise (a) first and second elongate electrodes, (b) a plurality of resistive heating elements connected in parallel between said electrodes, e.g. a continuous strip of a conductive polymer in which the electrodes are embedded or which is wrapped around the electrodes, and (c) an insulating jacket which surrounds the electrodes and the heating elements. These heaters may be cut to the appropriate length for use in each application and the exposed ends must then covered. This is often accomplished by the use of wrapped tape, heat-shrinkable tubing or other sealing means. Such coverings may be bulky, craft-sensitive, and susceptible to moisture ingress.

End caps and sealing devices intended to provide electrical insulation and environmental protection to the cut ends are known. Some sealing devices serve not only to seal the ends and prevent the exposure to moisture, but also grip the heater in order to prevent pullout of the heater from the device during use. The device disclosed in U.S. Pat. No. 4,751,350 (Eaton), the disclosure of which is incorporated herein by reference, comprises a cap in which a plurality of resilient projections positioned at specific angles within the cap are used to grip an electrical cable. The cap provides a particularly effective seal when it is filled with a gel or other conformable material which effectively contacts the inserted cable.

When the heater comprises a conductive metal braid which surrounds the insulating jacket, the problem of making an effective seal becomes more difficult. The braid, which is for use in grounding the heater, accelerates the wicking of moisture down the length of the heater. In addition, the braid, which itself may be surrounded by an outer insulating jacket, interferes with the ability of a sealing device to adequately grip the heater. This may create a situation in which the braid can slip with respect to the insulating jacket, thus decreasing the "pullout force", i.e. the amount of force which is required to remove the heater from the sealing device. It is also necessary that the braid be removed or cut back from the end of the heater in order to prevent shorting of the electrodes to the braid.

SUMMARY OF THE INVENTION

I have now designed a sealing device which is useful for making an effective seal to the end of an elongate electrical heater. The sealing device provides adequate pullout strength to heaters which comprise both an insulating polymeric jacket and a metallic grounding braid surrounding the insulating jacket. Under some conditions, insertion of the heater into the sealing device serves to push back the braid from the exposed electrodes. One size of sealing device is suitable for heaters in a variety of sizes. In a first aspect, this invention discloses an apparatus for sealing an end of an elongate electrical heater, said heater comprising (a) first and second elongate electrodes, (b) a plurality of resistive heating elements connected in parallel between said electrodes, (c) an insulating jacket surrounding said electrodes and heating elements, and (d) a metallic grounding braid surrounding said insulating jacket, said apparatus comprising a housing of generally tubular shape, the housing comprising (1) a first open end and a second closed end;
(2) a longitudinal top portion with an interior surface and an exterior surface and a longitudinal bottom portion with an interior surface and an exterior surface;
(3) a plurality of first gripping members which are associated with the top portion and protrude from the interior surface thereof; and
(4) a plurality of second gripping members which are associated with the bottom portion and protrude from the interior surface thereof.

In a second aspect this invention provides an assembly comprising an apparatus and an end of an elongate electrical heater, said heater comprising (a) first and second elongate electrodes, (b) a plurality of resistive heating elements connected in parallel between said electrodes, (c) an insulating jacket surrounding said electrodes and heating elements, and (d) a metallic grounding braid surrounding said insulating jacket, said apparatus comprising a housing of generally tubular shape which comprises (1) a first open end and a second closed end;
(2) a longitudinal top portion with an interior surface and an exterior surface and a longitudinal bottom portion with an interior surface and an exterior surface;
(3) a plurality of first gripping members which are associated with the top portion and protrude from the interior surface thereof; and
(4) a plurality of second gripping members which are associated with the bottom portion and protrude from the interior surface thereof, the insulating jacket being directly contacted with at least one first gripping member and at least one second gripping member and the metallic grounding braid (a) being contacted directly or through an outer insulating jacket which surrounds the braid by at least one first gripping member and at least one second gripping member and (b) being pushed back from the end of the heater.

BRIEF DESCRIPTION OF THE DRAWING

The invention is illustrated by the drawing in which
FIG. 1 shows a perspective view, including a cutaway view, of the apparatus of the invention;
FIG. 2 shows the apparatus of FIG. 1 following the insertion of a heater;
FIG. 3 shows an alternative construction for the apparatus of the invention;
FIG. 4 is a schematic cross-sectional view of the apparatus; and
FIG. 5 is a cross-sectional view of a gripping member which comprises part of the apparatus.

DETAILED DESCRIPTION OF THE INVENTION

Elongate electrical heaters which may be adequately sealed by means of this sealing device are those which comprise first and second elongate electrodes, a plurality of resistive heating elements connected in parallel between the electrodes, and an insulating jacket surrounding the electrodes and heating elements. Self-regulating strip heaters in which the electrodes comprise elongate wires and the resistive heating elements comprise a conductive polymer composition are particularly suitable. Heaters of this type are well known; see, for example, U.S. Pat. Nos. 3,858,144 (Bedard et al), 4,017,715 (Whitney et al), 4,242,573 (Batliwalla), 4,246,468 (Horsma), 4,334,148 (Kampe), 4,334,351 (Sopory), 4,398,084 (Walty), 4,400,614 (Sopory), 4,425,497 (Leary), 4,426,339 (Kamath et al), 4,459,473 (Kamath) 4,547,659 (Leary), 4,582,983 (Midgley et al), 4,574,188 (Midgley et al), 4,659,913 (Midgley et al), 4,661,687 (Afkhampour et al), 4,673,801 (Leary), and 4,764,664 (Kamath et al), the disclosure of each of which is incorporated herein by reference. In order to provide electrical insulation and environmental protection, the resistive heating elements are surrounded by an electrically insulating jacket which is often polymeric, but may be any suitable material. The jacket may be surrounded by a metallic grounding material which is preferably in the form of a braid, although a sheath or other configuration may be suitable if flexibility of the heater is not crucial. In addition to serving to electrically ground the heater, the grounding braid provides mechanical strength. The braid itself may be surrounded by an outer jacket which is usually polymeric and serves to insulate the metallic grounding braid. The resulting heater frequently has an approximately rectangular cross-section with two generally parallel faces, although other geometries (e.g. elliptical, oval, round) are also appropriate.

The housing of the apparatus may be of any suitable shape, e.g. generally tubular or rectangular, as long as it comprises an opening of a shape which is suitable for insertion of the heater. The housing may be a single piece which has been molded into the appropriate shape or assembled into a permanent configuration from a number of pieces or it may comprise first and second housing members which are capable of existing in a demated or a mated configuration. In the demated configuration the housing members may be separate pieces or they may be connected, e.g. by hinges or straps. When mated, the housing members are in contact with each other (directly or through a sealing member, e.g. a gasket) and, as such, form a housing which provides a suitable opening. The housing members may be maintained in their mated configuration by means of securing means such as a strap, a spring clamp, or a plurality of screws, but preferably the two housing members snap-fit together. In both the one- and two-piece embodiments the housing exhibits a first open end through which the heater is inserted and a second closed end. The housing may be physically or notionally separated into a longitudinal top portion and a longitudinal bottom portion, top and bottom being defined with respect to the axis of the housing, i.e. parallel to the axis of the opening. Both the top and bottom portions comprise an interior surface which is adjacent to and parallel to the opening and an exterior surface which is generally the exterior of the housing.

An important aspect of the sealing device of the invention is that it hold both the insulating jacket and the braid of the heater with sufficient force so that the heater cannot readily be pulled out during use and the insulating jacket and the braid will not slip with respect to one another. Often a "pullout force" of at least 25 pounds, preferably at least 30 pounds, particularly at least 35 pounds, e.g. 40 to 60 pounds, is required for routine use. (The pullout force or pullout strength is measured with an Instron TM tensile testing apparatus. The heater is gripped by one jaw of the Instron and the sealing device by the other jaw. The force required to pull the heater 0.125 inch (0.318 cm) out of the sealing device when the jaw holding the sealing device is stationary and the jaw holding the heater is moved is measured.) Acceptable gripping of both the insulating jacket and the braid is provided by this invention by means of a plurality of first gripping members which are associated with the top portion of the housing and a plurality of second gripping members which are associated with the bottom portion of the housing. The first and second gripping members, which are also referred to herein as "teeth", are positioned and dimensioned such that they protrude from the top and the bottom portion of the housing, respectively. As the heater is inserted into the opening, the gripping members are forced against opposite faces of the heater. Insertion may be accomplished in the one-piece housing by feeding the heater longitudinally through the open end of the housing, i.e. along the axis of the opening. In the two-piece housing, the heater may be inserted longitudinally or horizontally, i.e. with the longitudinal axis of the elongate heater perpendicular to the axis of the opening. A maximum insertion force of at most 10 pounds, preferably at most 8 pounds, is needed for ease of use. Complete insertion and sufficient sealing is achieved when the insulating jacket is directly contacted by at least one first gripping member and at least one second gripping member and the braid, either directly or indirectly through an outer insulating jacket which surrounds the braid, is contacted by at least one first gripping member and at least one second gripping member. The teeth are so positioned that with the one-piece sealing device, in addition to providing adequate gripping, at least one pair of teeth serve to push the braid back from the cut end of the heater, thus exposing the insulating jacket and allowing contact to occur.

The design of the gripping members is dependent on the size of the heater and the desired pullout force. When the housing comprises a single main piece, the teeth may be secured to the top and bottom portion of the housing or to an insert which may be positioned and secured within the housing. When the housing comprises two pieces, the teeth may be secured to the first and second housing members (wherein one of the housing members represents the top portion and the other housing member represents the bottom portion) or to the top and bottom portion of either the first or second housing members. The teeth are longitudinally spaced from the open end to the closed end of the housing either at uniform intervals or preferably at graduated intervals, with greater space between two adjacent teeth near the open end and smaller space between two adjacent teeth near the closed end. The first and second gripping members are preferably positioned directly opposite one another, rather than offset, for ease of insertion of the heater into the housing. The gripping members do not cover the entire circumference of the opening and thus the housing is suitable for heaters in a variety of widths. In order to accommodate a variety of heater thicknesses, the teeth are graduated in length, the length being measured from the base of the tooth (usually on the interior surface of the housing) to the end of the gripping end. When there are shorter teeth near the open end and longer teeth near the closed end the width of the opening between each pair decreases and the "front" teeth, i.e. those nearer the open end, are able to push the braid back from the end of the heater and expose the insulating jacket to be gripped by the "back" teeth when the heater is inserted. In a particularly useful design comprising three pair of teeth, the opening between the front teeth is 0.195 inch (0.495 cm), that between the center teeth is 0.165 inch (0.419 cm), and that between the back teeth is 0.126 inch (0.320 cm). This apparatus would be useful for heaters with a thickness of about 0.150 inch to 0.245 inch (0.381 cm to 0.622 cm).

The gripping members are generally of rectangular cross-section, although other shapes may also be used. The teeth may be positioned squarely on the interior surface of the top or bottom portions of the housing, i.e. perpendicular to the interior surface at an angle of 90 degrees to the surface, but for effective gripping the teeth are preferably angled from the base away from the open end so that the side of the gripping member facing the open end is at an angle B to the axis of the housing. The angle B is generally 5 to 20 degrees, preferably 7 to 17 degrees, particularly 8 to 14 degrees, e.g. 10 degrees. Although the gripping surface (i.e. the "gripping end") of the teeth may be flat and perpendicular to the base of the tooth, it is preferred that the surface of the tooth have an angle A which, when measured parallel to the interior surface and to the axis of the opening, is 15 to 40 degrees, preferably 20 to 35 degrees, particularly 25 to 35 degrees, e.g. 30 degrees. The angle A is angled away from the open end so that when a pullout force is applied to the heater the tooth will grip the heater more firmly. For some applications, the teeth may be serrated.

In order to achieve acceptable pullout strength for both the insulating jacket and the braid, it is preferred that each of the gripping members penetrate the substrate with which it is in contact, i.e. the insulating jacket, the braid, or the outer jacket, by at least 0.010 inch (0.025 cm), preferably at least 0.015 inch 0.038 cm), particularly at least 0.020 inch (0.051 cm), especially at least 0.025 inch (0.064 cm).

The sealing device of the invention and any necessary inserts may comprise an insulated metal or ceramic, but preferably comprise a polymer which has an impact strength of at least 5 foot-pounds as measured by tests such as ASTM D3029 or UL 746C when shaped into the configuration of the device. Internal elements such as ribs and bosses and external elements such as grooves may be incorporated into the design to increase the impact strength. Suitable materials are of light weight, can be shaped by injection- or transfer-molding, and will withstand specified continuous use and intermittent use temperatures. It is also preferred that the polymer comprising the gripping members, which may be the same or different from that comprising the housing, be somewhat resilient, e.g. have a flexural modulus of 300,000 to 400,000 psi. The exact choice of polymer for the gripping members is dependent on the pullout force required and the insertion force needed for the heater. Appropriate polymers include polycarbonate, nylon, polyester, polyphenylene sulfide, polyphenylene oxide and other engineering plastics. When, as with complex designs, it is preferred that the housing be molded in several discrete pieces, polymers which can then be attached by means such as solvent welding or ultrasonic welding are appropriate.

In order to ensure that an adequate environmental seal is achieved around the end of the heater, it is preferred that a viscous sealing material be present. Suitable materials include greases, adhesives, mastics, gels, and other materials, which, under compression, tend to conform around the surface of the heater to make a seal. Particularly preferred as sealing materials are gels, e.g. silicone gels, such as those disclosed in U.S. Pat. Nos. 4,369,284 (Chan), 4,600,261 (Debbaut), 4,634,207 (Debbaut), 4,643,924 (Debbaut), 4,690,831 (Debbaut), 4,716,183 (Gamarra et al), and 4,777,063 (Dubrow et al), and in copending commonly assigned U.S. application Ser. Nos. 153,541 filed Feb. 1, 1988 (Chang et al), 165,452 filed Mar. 1, 1988 (Debbaut), and 271,394 filed Nov. 10, 1988 (Chang et al). The disclosure of each of the above-referenced patents and applications is incorporated herein by reference. The gel may be placed within the sealing device prior to the insertion of the heater. If the sealing device comprises two housing members, the gel may be placed in one or preferably both sides of the housing members prior to use; when the housing members are formed into the mated configuration, the gel is displaced over the connection and the unbraided heater. This minimizes any moisture ingress from the metal grounding braid.

The invention is illustrated by the drawing in which FIG. 1 shows the apparatus of the invention in which the housing 1 has an open end 2 and a closed end 3. Three first gripping members 4,5,6 protrude from the top portion 7 and are directly opposite three second gripping members 9,10,11 which protrude from the bottom portion 8 of the housing.

The heater 12, inserted into the apparatus as shown in FIG. 2, comprises first and second electrodes 13,14 embedded in a conductive polymer 15. The insulating jacket 16 which surrounds the electrodes and the conductive polymer is surrounded first by a metal braid 17 and then by an outer jacket 18. First gripping members 5,6 and second gripping members 10,11 are in contact with the insulating jacket 16, while first gripping member 4 and second gripping member 9 contact the outer jacket 18.

FIG. 3 illustrates a housing 1 which comprises two hinged segments, a first housing member 19 and a second housing member 20. In this embodiment the heater 12 is inserted horizontally between the first gripping members 4,5,6 and the the second gripping members 9,10,11. A gel component may be present in either the first or the second housing member or both.

In the cross-sectional view of the housing 1 in FIG. 4, the first gripping members 4,5,6 protruding from the interior surface 21 of the top portion 7 and the second gripping members 9,10,11 protruding from the interior surface 22 of the bottom portion 8 of the housing are directly opposite one another. Those gripping members near the open end 2 of the housing are shorter in length than those near the closed end 3. Also shown are the exterior surface 23 of the top portion 7 and the exterior surface 24 of the bottom portion of the housing. Line I-I represents the axis of the housing through the opening.

FIG. 5 shows in cross-section a gripping member which is part of the housing. Gripping member 10 protrudes from the interior surface 22 of the bottom portion 8 of the housing at an angle B which is measured perpendicular to the interior surface 22 so that the side 25 of the gripping member facing the open end of the housing is at an angle B of 5 to 20 degrees. The gripping surface 26 of the gripping member is angled at an angle A which is measured parallel to the interior surface surface 22 of the housing, i.e. with respect to the axis of housing.

I claim:

1. An apparatus for sealing an end of an elongate electrical heater, said heater comprising (a) first and second elongate electrodes, (b) a plurality of resistive heating elements connected in parallel between said electrodes, (c) an insulating jacket surrounding said electrodes and heating elements, and (d) a metallic grounding braid surrounding said insulating jacket, said apparatus comprising a housing of generally tubular shape, the housing comprising
    (1) a first open end and a second closed end;
    (2) a longitudinal top portion with an interior surface and an exterior surface and a longitudinal bottom portion with an interior surface and an exterior surface;
    (3) a plurality of first gripping members which are associated with the top portion and protrude from the interior surface thereof, and which are of graduated length, the first gripping member nearest to the open end of the housing being shorter than the first gripping member nearest to the closed end of the housing; and
    (4) a plurality of second gripping members which are associated with the bottom portion and protrude from the interior surface thereof.

2. An apparatus according to claim 1 wherein the first gripping members are directly opposite the second gripping members.

3. An apparatus according to claim 1 wherein there are three first gripping members and three second gripping members.

4. An apparatus according to claim 1 wherein the first gripping members are secured to the top portion of the housing and the second gripping members are secured to the bottom portion of the housing.

5. An apparatus according to claim 1 wherein the second gripping members are of graduated length and the second gripping member nearest to the open end of the housing is shorter than the second gripping member nearest to the closed end of the housing.

6. An apparatus according to claim 1 wherein each of the first and the second gripping members comprises (1) a base which is associated with the housing and (2) a gripping end which (a) is at an angle A to the axis of the housing and (b) is suitable for penetrating the braid or the insulating jacket of the heater.

7. An apparatus according to claim 6 wherein the gripping end has an angle A of 15 to 40 degrees.

8. An apparatus according to claim 7 wherein the angle A is 25 to 35 degrees.

9. An apparatus according to claim 6 wherein the base is attached to the interior surface of the housing so that the side of the gripping member facing the open end of the housing is at an angle B to the axis of the housing and B is 5 to 20 degrees.

10. An apparatus according to claim 6 wherein the first and the second gripping members penetrate to a depth of at least 0.025 inch (0.0635 cm).

11. An apparatus according to claim 1 which further comprises a gel component.

12. An apparatus according to claim 1 wherein the housing comprises two housing members which can be in (a) a demated configuration or (b) a mated configuration in which the housing members are in contact with each other and form a housing.

13. An apparatus for sealing an elongate electrical heater, said heater comprising (a) first and second elongate electrodes, (b) a plurality of resistive heating elements connected in parallel between said electrodes, (c) an insulating jacket surrounding said electrodes and heating elements, and (d) a metallic grounding braid surrounding said insulating jacket, said apparatus comprising a housing which comprises
    (1) first and second housing members which can be in (a) a demated configuration or (b) a mated configuration in which the housing members are in contact with each other and form a housing having a first open end and a second closed end; and
    (2) a plurality of first gripping members which are secured to one surface of the first housing member and protrude therefrom and a plurality of second gripping members which are secured to an opposite surface of the first housing member and protrude therefrom, the first and second gripping members being such that, when a heater is inserted into the first housing member the insulating jacket is directly contacted by at least one first gripping member and at least one second gripping member and the metallic grounding braid is contacted directly or indirectly through an outer insulating jacket which surrounds the braid by at least one first gripping member and at least one second gripping member.

14. An apparatus according to claim 13 which further comprises
    (3) a gel component which is secured to the first or the second housing member when the housing members are in the demated configuration and which is deformed and seals around the end of the heater when the housing members are in the mated configuration.

15. An assembly comprising an apparatus and an end of an elongate electrical heater, said heater comprising (a) first and second elongate electrodes, (b) a plurality of resistive heating elements connected in parallel between said electrodes, (c) an insulating jacket surrounding said electrodes and heating elements, and (d) a metallic grounding braid surrounding said insulating jacket, said apparatus comprising a housing of generally tubular shape which comprises
    (1) a first open end and a second closed end;
    (2) a longitudinal top portion with an interior surface and an exterior surface and a longitudinal bottom portion with an interior surface and an exterior surface;
    (3) a plurality of first gripping members which are associated with the top portion and protrude from the interior surface thereof; and
    (4) A plurality of second gripping members which are associated with the bottom portion and protrude from the interior surface thereof,
the insulating jacket being directly contacted with at least one first gripping member and at least one second gripping member and the metallic grounding braid (a) being contacted directly or through an outer insulating jacket which surrounds the braid by at least one first gripping member and at least one second gripping member and (b) being pushed back from the end of the heater.

16. An assembly according to claim 15 wherein a gel component within the housing is deformed and seals around the the insulating jacket and the heater end.

17. An assembly according to claim 15 wherein a pullout force of at least 25 pounds is required to pull the heater out of the housing.

18. An assembly according to claim 17 wherein a pullout force of at least 30 pounds is required.

* * * * *